June 1, 1954   D. G. SBARRA   2,680,021
ORTHOPEDIC EXERCISING CYCLE
Filed July 8, 1952
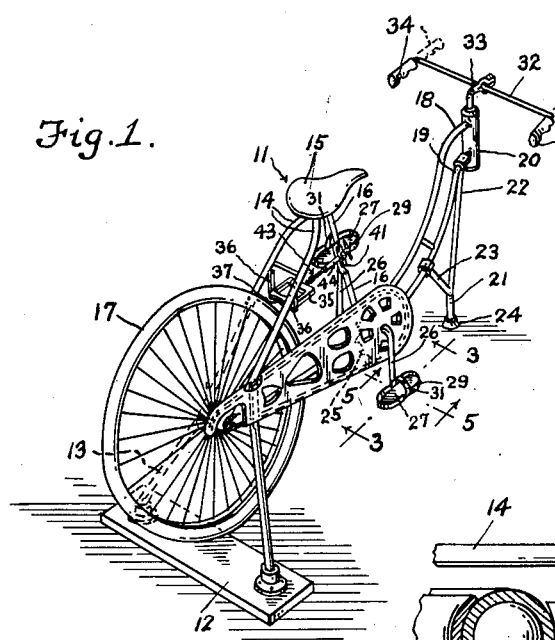
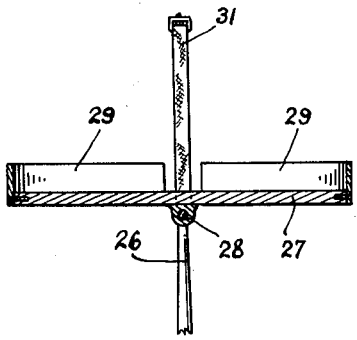
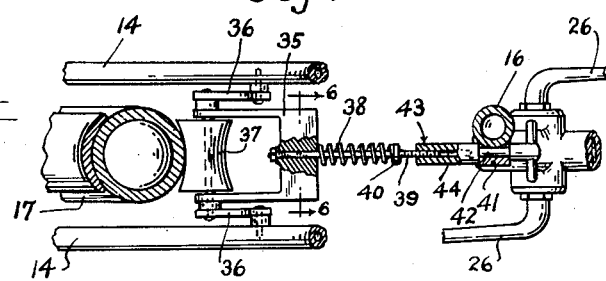
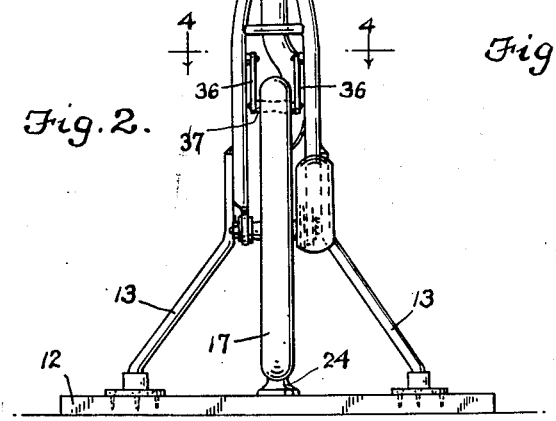
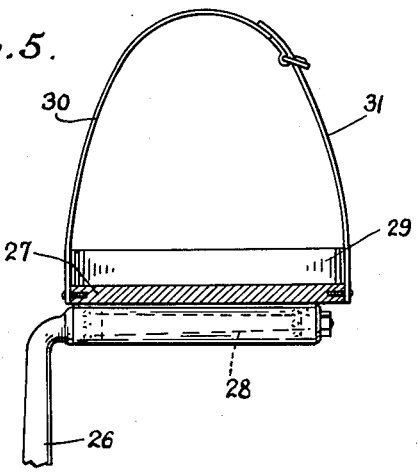
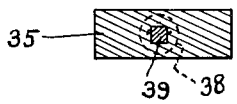
INVENTOR.
Dominic G. Sbarra
BY
McMorrow, Berman & Davidson
Attorneys.

Patented June 1, 1954

2,680,021

UNITED STATES PATENT OFFICE 2,680,021

ORTHOPEDIC EXERCISING CYCLE

Dominic G. Sbarra, Ossining, N. Y.

Application July 8, 1952, Serial No. 297,622

1 Claim. (Cl. 272—73)

This invention relates to exercising apparatus, and more particularly to an improved orthopedic exercising device of the bicycle type.

The main object of the invention is to provide a novel and improved exercising apparatus of the bicycle type which is operable by a person when seated thereon.

A further object of the invention is to provide an improved orthopedic exercising apparatus of the bicycle type which is simple in construction, which may be readily adjusted to provide a desired resistance to rotation of the driven bicycle wheel thereof, and which is durable in construction.

Further objects and advantages of the invention will become apparent from the following description and claim, and from the accompanying drawings, wherein:

Figure 1 is a rear perspective view of an improved orthopedic exercising apparatus constructed in accordance with the present invention.

Figure 2 is a rear end elevational view of the apparatus of Figure 1.

Figure 3 is an enlarged cross sectional detail view taken on the line 3—3 of Figure 1.

Figure 4 is an enlarged fragmentary horizontal cross sectional detail view taken on the line 4—4 of Figure 2.

Figure 5 is an enlarged cross sectional detail view taken on the line 5—5 of Figure 1.

Figure 6 is an enlarged cross sectional detail view taken on the line 6—6 of Figure 4.

Referring to the drawings, the illustrated exercising device is designated generally 11 and comprises a rectangular base member 12 to which is secured an upstanding frame having the downwardly divergent rear legs 13, 13 respectively secured to the opposite end portions of the base 12, said frame including the upwardly convergent tubular frame elements 14, 14, to the top ends of which is secured the seat 15, said seat being mounted on a tubular, downwardly and forwardly inclined frame element 16 with which the upwardly convergent frame elements 14, 14 merge, as shown in Figure 2. Journaled in the lower rear portion of the frame between the members 13, 13 is the bicycle wheel 17. The forward portion of the frame comprises the upwardly and forwardly inclined elements 18 and 19 which are rigidly connected to the vertical sleeve member 20. Designated at 21 is a generally Y-shaped foot member having the relatively long leg 22 connected to the lower frame element 19 adjacent the sleeve 20 and having the relatively short arm 23 connected to the arm 19 at its intermediate portion, as shown in Figure 1. The lower end of the leg member 22 terminates in the floor-engaging cushioned foot 24. Journaled to the intermediate portion of the frame in a conventional manner is the sprocket 25 which is coupled by a sprocket chain to a conventional, smaller sprocket carried by the wheel 17, whereby the wheel may be rotated by rotating the sprocket 25. The sprocket 25 is provided with the respective cranks 26, 26, and rotatably mounted on the end of each crank 26 is a pedal 27, said pedal being journaled on an arm 28 extending at right angles to and rigid with the crank $26_A$ as shown in Figures 3 and 5. Each pedal 27 is formed with the upwardly extending peripheral flange elements 29, said flange elements being located at the opposite ends of the pedals and being arranged to receive the heel of the user's foot from either end, as for example, either from a position wherein the operator is supported on the seat 15, or from a position wherein the operator is seated in a wheel chair or the like in front of the machine. Secured to the intermediate portions of the side edges of the pedals 27 are the respective securing strap members 30 and 31 enabling the user of the apparatus to fasten his feet securely to the pedals 27.

Designated at 32 is a transverse handle bar which is secured on a depending mounting bar 33 received in and adjustably secured in the sleeve element 20. The handle bar 32 is provided at its ends with the grip elements 34, 34 extending at right angles to the main body portion of the handle bar, and the handle bar 32 may be secured either in a position wherein the grip elements 34, 34 are directed toward the seat 15, or in a position wherein said handle elements 34, 34 extend forwardly from the apparatus, as shown in dotted view in Figure 1. The supporting bar 33 may be secured in any suitable manner in the sleeve element 20, as by means of a conventional set screw or the like.

Designated at 35 is a yoke member located below the seat 15 and above the peripheral portion of the wheel 17, the arms of said yoke member being swingably secured to the frame elements 14, 14, as by the link bars 36, 36 shown in Figure 4. Journaled between the arms of the yoke member 35 is the friction roller 37 which is engageable with the peripheral portion of the wheel 17, as shown in Figure 4. The yoke member 35 is biased toward the periphery of the wheel 17 by a coiled spring 38 which surrounds a threaded rod 39 having a squared portion keyed in and slidably extending through the bight portion of the yoke member 35, said rod being provided with an integral collar 40 bearing on the end of the spring 38, as shown in Figure 4. Secured to the forwardly and downwardly inclined frame element 16 is a bracket member 41 which rotatably receives the reduced forward end portion 42 of a tensioning nut 43, said tensioning nut 43 being formed with an internally threaded sleeve portion 44 which is threadedly engaged on the rod 39, the sleeve portion 44 being rotatable around the axis of the reduced bearing portion 42 to advance or retract the rod 39 relative to the bight portion of the yoke member 35, thus varying the tensioning force applied to the spring 38. The tensioning nut 43 is readily accessible either from above, as where the user is mounted on the seat 15, or from in front of the apparatus, as where the user is seated in a wheel chair on front of the apparatus. The degree of resistance to rotation of the wheel 17 may thus be readily adjusted from either position of use of the machine.

In using the device, the operator may be mounted in the seat 15 with his feet secured in the pedals 27, as above described, and with his hands grasping the handle elements 34, 34. By reaching downwardly and rotating the tensioning nut 43, the degree of resistance to pedalling may be readily regulated by the operator in this position. Alternatively, the user of the device may be seated in a wheel chair or in any other type of chair in front of the apparatus with his legs extending on opposite sides of the Y-shaped leg element 21 and with his feet secured in the pedals 27, 27. The handle bar 32 will then be in a position with the grip elements 34, 34 extending forwardly, enabling the operator of the apparatus to grasp said handle bar elements 34, 34, while operating the pedals 27, 27. In this latter position of use, the degree of resistance to rotation of the wheel 17 may be readily adjusted by reaching forwardly and rotating the tensioning nut 23.

While a specific embodiment of an improved orthopedic exercising apparatus has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

An exercising apparatus comprising a base, an upstanding frame having a depending rear portion secured to said base, a wheel journaled on said rear portion above said base, a seat mounted on the upper end of said rear portion, a sprocket rotatably mounted on said frame forwardly of and below said seat, a sprocket chain coupling said sprocket to said wheel, cranks secured to opposite sides of the sprocket, pedals secured on said cranks, a depending leg element rigidly secured to the forward end of the frame and adapted to supportingly engage the floor forwardly of the pedals, a yoke swingably secured to said rear portion of the frame below the seat and adjacent to the upper peripheral portion of the wheel, said yoke having spaced arms, a roller journaled in the arms of said yoke member and engageable with said peripheral portion of the wheel, and adjustable spring means mounted on said frame and biasing said yoke member and roller toward said peripheral portion, said last-named means comprising a coiled spring engaging a portion of the yoke, a flanged bolt extending through said spring and the bight portion and engaging an end of the spring, and a shouldered sleeve rotatably mounted on the frame and threadedly engaging said bolt.

References Cited in the file of this patent

UNITED STATES PATENTS

| Number | Name | Date |
| --- | --- | --- |
| D. 158,675 | Longfellow | May 23, 1950 |
| 553,373 | Webber | Jan. 21, 1896 |
| 589,705 | Dwyer | Sept. 7, 1897 |
| 593,105 | Kingsbury | Nov. 2, 1897 |
| 1,744,607 | Baine | Jan. 21, 1930 |
| 2,043,977 | Back | June 16, 1936 |
| 2,198,058 | Mobeck | Apr. 23, 1940 |
| 2,261,846 | Dollinger | Nov. 4, 1941 |